United States Patent [19]

Smead

[11] 3,725,646

[45] Apr. 3, 1973

[54] SYSTEM FOR REPRODUCING DIGITAL INFORMATION

[75] Inventor: David E. Smead, Camarillo, Calif.

[73] Assignee: Minnesota Mining and Manufacturing Company, St. Paul, Minn.

[22] Filed: Apr. 19, 1971

[21] Appl. No.: 135,070

[52] U.S. Cl. ....................235/61.11 D, 340/174.1 H

[51] Int. Cl. ............................G06k 7/08, G11b 5/00

[58] Field of Search.........235/61.11 D; 340/174.1 H; 178/17 D, 68; 325/38 R, 38 A, 38 B, 321; 328/34; 307/234

[56] References Cited

UNITED STATES PATENTS 3,623,074 11/1971 Bailey..........................340/174.1 H

*Primary Examiner*—Daryl W. Cook

*Attorney*—Smyth, Roston & Pavitt

[57] ABSTRACT

A system is provided for reading from a medium signals representing digital information and having excursions between positive and negative peaks in a pattern dependent upon the digital information and for reproducing the digital information from such signals. The system may rectify the signals to produce unidirectional signals. The system then converts the unidirectional signals to signals having amplitudes compressed such as by a logarithmic function relative to the amplitudes of the unidirectional signals. The system then integrates the logarithmic signals in an integrator having stable and uniform characteristics over a wide band of frequencies. The system uses the integrated signals and the logarithmic signals to produce control signals at the peaks of the amplitudes of the logarithmic signals. The system then uses the control signals to reproduce the digital information.

17 Claims, 6 Drawing Figures

INVENTOR:
David E. Smead
By Smyth, Roston & Pavitt
ATTORNEYS

SYSTEM FOR REPRODUCING DIGITAL INFORMATION

This invention relates to a system for reading from a medium signals representing digital information and having excursions between positive and negative peaks in a pattern dependent upon the digital information and for reproducing the digital information from such signals. The invention particularly relates to a system for integrating the signals and using the integrated signals to obtain the reproduction of the digital information. As one of the features of the invention, the system converts the signals read from the medium to signals having amplitudes compressed relative to the amplitudes of the signals read from the medium before the signals are integrated.

Various methods have been used for recording digital information on a medium such as a tape and for reproducing the digital information from the signals recorded on the tape. In one method of recording digital information on a medium such as a tape, a binary "1" is recorded by a change of signal at an intermediate instant of time in each clock signal and a binary "0" is recorded by no change in signal at the intermediate instant of time during the clock signal. This means that a binary "1" has a frequency substantially twice as great as a binary "0" when recorded on the medium such as the tape. This method of recording is known as "bi-phase mark" recording and has been previously known as "Manchester 1" recording.

Since two different frequencies are recorded on the medium such as the tape with one frequency being substantially twice the other, the reproducing system has to respond through a wide range of frequencies in order to recover the indications of binary "1" and binary "0." These problems are further complicated when the medium such as the tape is moved at different speeds during recording and at corresponding speeds during reproduction. Because of such wide variations in frequency, the reproducing systems have not always been able to operate satisfactorily in reproducing from the medium such as the tape the digital information represented by the binary "1's" and the binary "0's."

Various attempts have been made in the past to provide systems for overcoming the above disadvantages. The systems have generally operated to differentiate the signals read or reproduced from the tape. By differentiating the reproduced signals, the differentiated signals have had zero crossovers (or transitions through an amplitude of zero) at approximately the times of occurrence of the peak amplitudes in the reproduced signals. The zero crossovers of the differentiated signals have then been detected to produce control signals which have been used to reproduce the digital information.

The systems of the prior art have had certain disadvantages. One disadvantage has been that the amplitudes of the signals representing a binary "1" have been considerably less than the amplitudes of the signals representing a binary "0" because the frequency of the signals representing a binary "1" has been substantially twice as great as the frequency of the signals representing a binary "0." Furthermore, a phase shift has occurred in reading the signals representing the binary "1" because of the increased frequency of these signals. This phase shift has distorted the position of zero crossover in the differentiated signal so as to inhibit the reproduction of the digital information in the proper time pattern.

In co-pending application Ser. No. 135,184 filed by Dieter H. Hoffmann for a "System for Reproducing Digital Information" and assigned of record to the assignee of record in this application, a system is disclosed for at least partially overcoming the above disadvantages. The system operates in a proper manner regardless of any pattern of occurrence of binary "1's" and binary "0's" so as to be independent of any amplitude changes that occur in the reproduction of binary "1's" relative to the reproduction of binary "0's." The system also does not provide any phase distortion when binary "1's" are reproduced from the medium such as the tape.

In the system disclosed in co-pending application Ser. No. 135,184, the signals read from the tape may be rectified to produce unidirectional signals. The system then integrates each of the unidirectional signals and produces a storage of energy in a storage member such as a capacitor in accordance with such integration, this energy being represented by a voltage across the capacitor. The relative amplitudes of the unidirectional signal and the voltage across the capacitor control the state of operation of a member such as a semiconductor. For example, the semiconductor may remain conductive until the occurrence of the peak amplitude in the unidirectional signal. At such time, the semiconductor may become nonconductive to produce a control signal. Since this control signal is reproduced in the middle of each clock period only upon the occurrence of a digital "1," the control signal may be used to reproduce the digital information.

This application discloses and claims a system which provides an improved performance over the system disclosed and claimed in copending application Ser. No. 135,184. The system disclosed and claimed in this application is able to operate satisfactorily over a wide range of frequencies of signal recording. Such a wide range of frequencies results in part from the operation of a recording medium such as a tape at different speeds and further results from the recording of the binary "1's" and the binary "0's." The system is able to operate satisfactorily even with considerable variations in the amplitudes of the signals reproduced from the tape at the different tape speeds.

In the system constituting this invention, the signals reproduced from the tape may be initially rectified to produce signals of a unidirectional polarity. The signals are then compressed in amplitude as by a logarithmic function. By compressing the signals in amplitude, variations in the amplitudes of the signals at the different tape speeds are considerably reduced.

The signals are then integrated by a unique integrating circuit having stable and uniform operating characteristics over a wide range of frequencies corresponding to those which are encountered when the medium such as the tape are operated at the different speeds. The integrating circuit includes a high-gain, high-bandwidth amplifier and a storage member such as a capacitor which is charged in accordance with the characteristics of the logarithmic signal. The amplifier operates to produce an output signal in accordance with the relative values of the logarithmic signal and the charge in the capacitor. For example, the amplifier may produce an output signal when the amplitude of the signal becomes substantially equal to the voltage resulting from the charge in the capacitor. This occurs at substantially the peak amplitude of the logarithmic signal.

Figure 1:
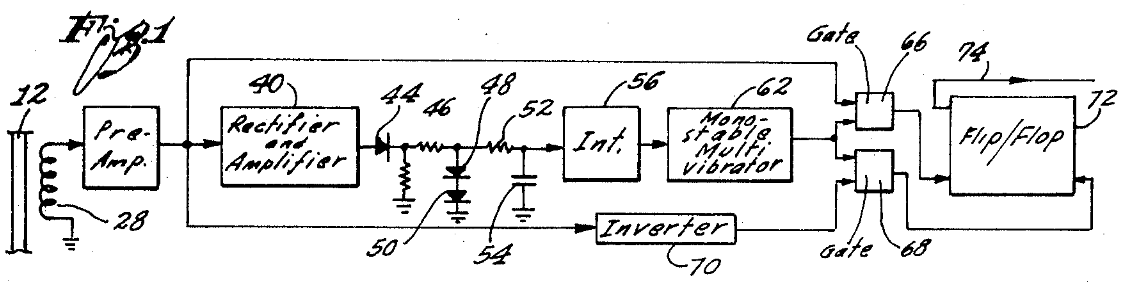
FIG. 1 is a diagram, essentially in block form, of a system constituting one embodiment of the invention for reproducing digital information from a medium such as a tape.
Figure 2:
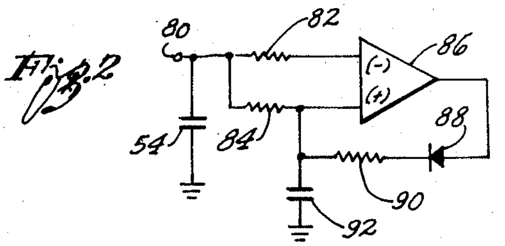
FIG. 2 is a circuit diagram of an integrator which is included in the system shown essentially in block form in FIG. 1.
Figure 4:
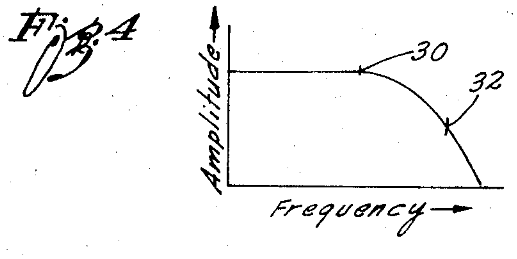

FIGS. *3a* to *3h*, inclusive, constitute curves illustrating the operation of the system shown in FIGS. 1 and 2;

FIG. 4 constitutes a curve illustrating the relative amplitudes of the signals read from the medium such as the tape to represent binary "1's" and binary "0's;"

Figure 5:
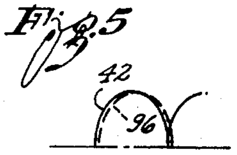
Figure 6:
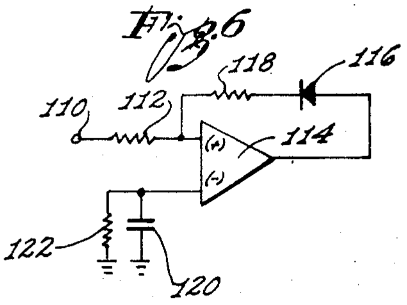

FIG. 5 constitutes voltage wave forms illustrating the operation of the integrator shown in FIG. 2; and FIG. 6 is a circuit diagram of another integrator which may be included in the system shown essentially in block form in FIG. 1.

The system constituting this invention is particularly adapted to be used with the method of recording known as "bi-phase mark" and previously known as "-Manchester 1." This method of recording may be seen from the curves shown in FIGS. *3a*, *3b* and *3c*. These curves include clock signals 10 illustrated in FIG. *3a*. The clock signals define timing periods each of which commences with the production of a positive pulse, provides a transition from a positive pulse to a negative pulse half way through the clock period and terminates at the conclusion of the negative pulse.

When a binary "1" is to be recorded on a medium such as a tape 12 (FIG. 1), a change in the polarity of the signal occurs at an intermediate time in the clock period in synchronism with the change in the clock signal from a positive to a negative value. For example, FIG. *3b* illustrates a random sequence of binary "1's" and binary "0's" which may be recorded on the medium such as the tape 12. FIG. *3c* illustrates the resultant pattern of signals recorded on the tape 12 in the biphase mark method. As will be seen in FIG. *3c*, a binary "1" may be recorded as indicated at 14 by producing a transition from a positive to a negative polarity. Similarly, a binary "1" may be recorded after the recording of a digital "0" by producing a transition 16 in FIG. *3c* from a negative to a positive value at an intermediate time in the clock period.

A binary "0" may be recorded by producing no change in the polarity of the recorded signal at the intermediate time in the clock period. For example, a binary "0" may be recorded as at 18 in FIG. *3c* by continuing a positive signal throughout a clock period. Similarly, a binary "0" may be recorded as at 20 in FIG. *3c* by continuing a negative signal throughout a clock period and a binary "0" may be subsequently recorded as at 22 in FIG. *3c* by continuing a positive signal throughout a clock period. As will be noted, a transition occurs between positive and negative polarities at the end of each clock period whether a binary "1" or a binary "0" has been recorded during the clock period.

As will be seen from FIG. *3c*, the signals representing a binary "1" have a frequency substantially twice as great as the signals representing a binary "0." This results from the transition between positive and negative polarities at an intermediate time in a clock period for a binary "1." When the signals are recorded on the medium such as the magnetic tape 12 by a transducer such as a magnetic head, the signals may have a waveform such as illustrated at 26 in FIG. *3d*. As will be seen in FIG. *3d*, the rectangular characteristics of the binary signals are lost during recording because the transducer such as the magnetic head is not able to respond to the high frequencies which produce the rectangular characteristics in the digital signals.

The amplitude characteristics of the binary signals become further deteriorated when the signals recorded on the tape are read from the tape by a magnetic transducer such as a head 28. For example, the signals read by the head 28 may have a first amplitude indicated at 30 in FIG. 4 when a binary "0" is read from the medium such as the tape 12. The signals read by the head 28 from the tape 12 may have a second amplitude indicated at 32 in FIG. 4 when signals representing a binary "1" are read from the tape 12. As will be seen, the signals 32 have an amplitude considerably lower than the signals 30 because of the amplitude response of the head 28 at the different frequencies.

Problems have resulted in the past because of the considerable differences in the amplitudes of the signals reproduced from the tape 12 to represent a digital "1" and a digital "0." Problems have also resulted in the past because the signals 26 reproduced by the head 28 from the tape have been differentiated to reproduce the digital information. By differentiating the signals 26, a differentiated signal having a zero amplitude is produced every time that the signals 26 reach a positive or negative peak. The positive and negative peaks have not always been able to be detected satisfactorily by the differentiating circuit, particularly when the amplitudes of the signals 26 have been relatively low for digital "1's." Furthermore, it has been difficult to detect zero crossovers in the differentiated signals, particularly when the frequency of the reproduced signals has been fairly high and especially when the binary "1's" have caused the frequency of the signals to become further increased.

This invention provides a system for reading the signals 26 and reproducing the digital information represented by such signals in a manner independent of any variations in the amplitude peaks of the signals. The system constituting this invention is also able to reproduce the digital information regardless of any crowding of the signals as a result of high frequencies of recording and reproducing and as a result of recording binary "1's."

In the system constituting this invention, the signals read by the head 28 may be introduced to a preamplifier 36 to obtain an amplification in the amplitude of such signals. The signals may be then introduced to a rectifier 40 to produce unidirectional signals illustrated at 42 in FIG. *3e*. The rectifier may provide further amplification at the same time that it rectifies.

The unidirectional signals from the rectifier 40 pass through a diode 44 which has an impedance to prevent signals with an amplitude less than a particular value such as one-half volt from passing. The signals passing through the diode 44 are then introduced to a stage formed by a resistor 46 and diodes 48 and 50. The anode of the diode 48 is connected to the resistor 46 and the cathode of the diode 48 is connected to the anode of the diode 50. The cathode of the diode 50 is connected to a suitable reference potential such as ground.

The circuit formed by the resistor 46 and the diodes 48 and 50 acts to compress the amplitude of the signals. For example, the circuit acts to produce on the anode of the diode 48 signals having an amplitude logarithmically related to the amplitude of the signals introduced to the resistor 46. By providing a logarithmic compression of the amplitudes of the signals, variations in the amplitudes of the signals as a result of frequency crowding such as illustrated in FIG. 4 and as a result of different tape speeds are largely eliminated. For example, when the amplitude of the signal varies between 20 and 2 as a result of frequency crowding and as a result of different tape speeds, the circuit formed by the resistor 46 and the diodes 48 and 50 operates to produce variations between approximately 3 and 0.7. By providing a logarithmic conversion in the amplitudes of the signals, any need to equalize the system for considerable variations in amplitudes at different frequencies is eliminated.

The logarithmic signals on the anode of the diode 48 are introduced to a high frequency filter formed by a resistor 52 and a capacitor 54 connected in series between the anode of the diode 48 and the reference potential such as ground. The filtered signals are then introduced to an integrator 56 which integrates the signals and produces control signals substantially at the peaks of the filtered signals. The control signals produced by the integrator 56 are illustrated at 58 in FIG. 3*f*. As will be seen in FIG. 3*f*, the control signals 58 have a sharp positive transition 60 at substantially the peak amplitudes of the unidirectional signals 42.

Figure 3:
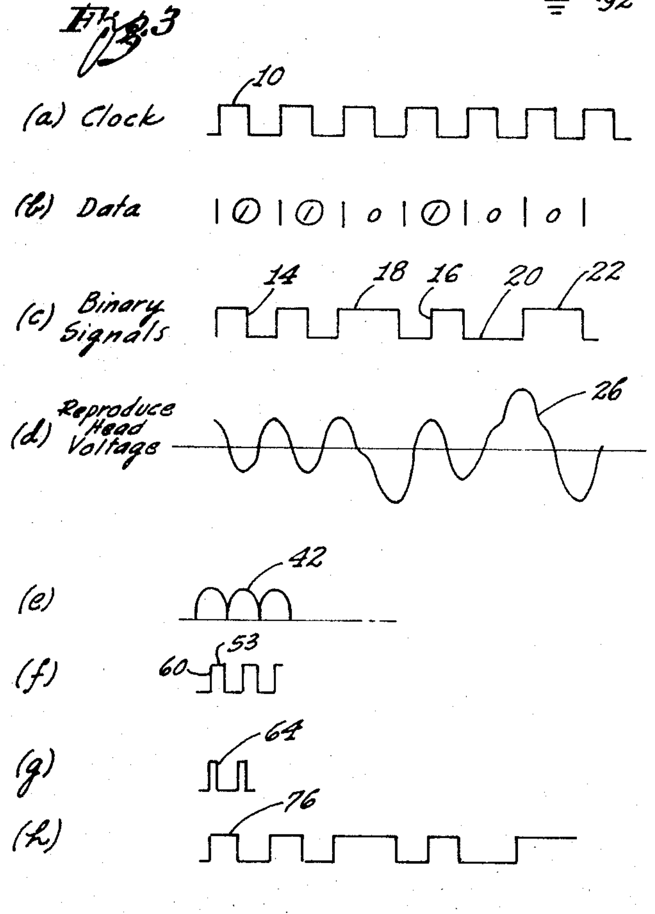

The transitions 60 in the control signals 58 cause a stage such as a monostable multivibrator 62 to be triggered to produce pulses illustrated at 64 in FIG. 3*g*. Each of the pulses 64 has a particular duration. The signals from the monostable multivibrator 62 pass through a pair of gates 66 and 68. The gate 66 also receives the signals produced by the preamplifier 36 and the gate 68 receives signals from an inverter 70 connected to the output of the preamplifier 36. By providing such an arrangement, the gate 66 passes the signals from the monostable multivibrator 62 when the preamplifier 36 produces signals of positive amplitude and the gate 68 passes the signals from the monostable multivibrator 62 when the preamplifier 36 produces signals of negative polarity.

The signals passing through the gates 66 and 68 are introduced to opposite input terminals of a bistable flip-flop 72. The signals from the gate 66 trigger the bistable flip-flop 72 to one state of operation such as a "true" state and the signals passing through the gate 68 trigger the bistable flip-flop 72 to the opposite state of operation such as a "false" state. The resultant signals produced on one output terminal of the bistable flip-flop are introduced to a line 74 to produce signals indicated at 76 in FIG. 3*h*. These signals represent the digital information previously recorded on the medium such as the magnetic tape 12.

One embodiment of the integrator 56 is shown in FIG. 2. In this embodiment the signals across the capacitor 54 are introduced to a terminal 80 which then introduces the signals to first terminals of a pair of resistors 82 and 84 having a suitable value such as 2,000 ohms. The second terminals of the resistors 82 and 84 are connected to input terminals of an amplifier 86 having a high gain and a high bandwidth. The amplifier 86 has characteristics of operating at a particular level upon the introduction of an input signal without going to saturation. Saturation of the amplifier 86 is not desirable since it would delay the recovery time of the amplifier and would prevent the amplifier from responding instantaneously to changes in the relative polarities of the input signals introduced to the two input terminals of the amplifier.

The output of the amplifier 86 is introduced to the anode of a diode 88, the cathode of which is connected to one terminal of a resistor 90 having a suitable value such as approximately 100,000 ohms. The second terminal of the resistor 90 is connected to the terminal common to the resistor 84 and the input to the amplifier 86, as is one terminal of a storage member such as a capacitor 92. The second terminal of the storage member is connected to the reference potential such as ground.

The logarithmic signal on the terminal 80 is introduced through the resistor 82 to the input terminal of the amplifier 86. The amplifier 86 has a high gain and provides an inversion of the signal so that a negative signal of a particular amplitude is introduced to the anode of the diode 88, which acts to prevent the signal from passing through the anode to the capacitor 92. The signal on the terminal 80 is also introduced to a circuit including the resistor 84 and the capacitor 92 and charges the capacitor in accordance with the amplitude of the logarithmic signal. The wave form of the charge in the capacitor 92 is illustrated at 96 in FIG. 5. Since the charging current also flows through the resistor 84, the voltage 96 produced across the capacitor 92 lags slightly the logarithmic signal introduced through the resistor 82 to the input terminal of the amplifier 86. The lag between the charging of the capacitor and the logarithmic signal is considerably less than that indicated in FIG. 5 FIG. 5 being exaggerated in time to provide a clear distinction between these signals.

A slight time after the logarithmic signal reaches its peak and starts to decline, the declining amplitude of the logarithmic signal equals the amplitude of the signal 96 produced across the capacitor 92. At this instant the signal introduced to the amplifier 86 through the resistor 82 becomes negative relative to the signal introduced to the amplifier from the capacitor 92. This causes the inverted signal from the amplifier 86 to be positive so that the diode 88 becomes forward biased. Current is then able to flow through the diode 88 and the capacitor 92. The production of the positive signal from the amplifier 86 is represented by the transition 60 in FIG. 3*f*.

When the amplitude of the logarithmic signal on the terminal 80 starts to decline, the capacitor 92 discharges through a circuit including the capacitor 92, the filtering capacitor 54 (also shown in FIG. 1) and the resistor 84. The discharge of the capacitor 92 is controlled by the declining amplitude of the logarithmic signal on the terminal 80. The discharge of the capacitor 92 is facilitated by the flow of current through the diode 88 and the resistor 90. In this way, the capacitor becomes completely discharged at substantially the instant that the amplitude of the logarithmic signal declines to zero. The integrating circuit shown in FIG. 2 is thus able to respond without any delay to the next logarithmic signal which is introduced to the terminal 80.

The integrator shown in FIG. 2 has certain important advantages. One advantage is that the integrator is stable in operation over a wide range of frequencies resulting from the movement of the medium such as the tape 12 past the head 28 at different speeds and further resulting from frequency crowding which is produced by the recording of binary "1's" on the tape. The integrator is stable over a wide range of frequencies even though the impedance presented by the capacitor 92 at the high frequencies is relatively low. Another advantage is that the integrator provides a high gain over a wide band range without becoming saturated. This is particularly important since the conversion of the signals read by the head 28 into logarithmic signals limits the amplitude of the signals introduced to the terminal 80.

It will be appreciated that the integrator shown in FIG. 2 can be reversed in operation without departing from the scope of the invention. For example, the capacitor 92 can be connected to the resistor 82 and the diode 88 can be inverted so that its cathode is connected to the output of the amplifier 86 and its anode is connected to the capacitor. When the integrator is inverted as described in this paragraph, the amplifier 86 produces a positive signal at its output until the time that the amplitude of the logarithmic signal equals the amplitude of the voltage produced across the capacitor 92. At such time, the amplifier produces a negative signal constituting the control signal and the diode becomes forwardly biased to facilitate the discharge of the capacitor 92.

FIG. 6 shows another embodiment of a circuit which may be used as the integrator 56. In the embodiment shown in FIG. 6, the logarithmic signals provided across the capacitor 54 in FIG. 1 are introduced to a terminal 110. The signals then pass through a resistor 112 to one input terminal of high-gain, high-bandwidth amplifier 114. The output of the amplifier 114 is introduced to an anode of a unidirectional member such as a diode 116 either directly or through a resistor 118. The cathode of the diode 116 is connected to the input terminal of the amplifier 114 common to the resistor 112. A second input terminal of the amplifier 114 is connected to the first terminals of a capacitor 120 and a resistor 122. Second terminals of the capacitor 120 and the resistor 122 are connected to a suitable reference potential such as ground.

The logarithmic signals passing through the resistor 112 to the amplifier 114 are amplified by the amplifier without inversion and are introduced to the diode 116. These signals pass through the diode to the input terminal of the amplifier to charge the capacitor 114 to bias the amplifier in a conductive direction. These signals are also introduced to the capacitor 120. Instantaneously, after the logarithmic signal on the terminal 110 reaches its peak, the amplitude of the logarithmic signal equals the amplitude of the voltage produced across the capacitor 120 and thereafter the voltage across the capacitor is greater in amplitude than the voltage introduced to the amplifier from the terminal 110. This causes the amplifier 114 to become nonconductive so that the diode 116 is no longer forwardly biased. The capacitor 120 then discharges through the resistor 122 during the time that the logarithmic signal is declining to an amplitude of zero. When the amplifier 114 becomes nonconductive, a negative signal is produced at the output of the amplifier to constitute the control signal. This control signal triggers the monostable multivibrator 62 to produce the signals 64.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In combination in a system for reading from a medium signals representing digital information and having excursions between positive and negative peaks in a pattern dependent upon the digital information and for reproducing the digital information from such signals, first means for reading the signals from the medium, second means responsive to the signals from the first means for rectifying such signals to produce signals of a unidirectional polarity, third means responsive to the unidirectional signals from the second means for producing signals having a compressed amplitude relative to the amplitudes of the signals from the second means, fourth means responsive to the compressed signals from the third means for integrating such signals to produce control signals upon the occurrence of the peak amplitudes from the logarithmic signals, and fifth means responsive to the control signals from the fourth means for reproducing the digital information.

2. The combination set forth in claim 1 wherein the integrating means includes an amplifier having an input and an output and unidirectional means connected between the input and the output of the amplifier.

3. The combination set forth in claim 1 wherein the integrating means includes a capacitor coupled to the third means to be charged by the signals of compressed amplitude and further includes means responsive to the signals of compressed amplitude and biased by the charge in the capacitor to produce the control signal upon the occurrence of the peak amplitudes in the signals of compressed amplitude.

4. The combination set forth in claim 1 wherein the third means produces signals having an amplitude logarithmically related to the amplitudes of the signals from the second means.

5. In combination in a system for reading from a medium signals representing digital information and having excursions between positive and negative peaks in a pattern dependent upon the digital information and for reproducing the digital information from such signals, first means for reading the signals from the medium, second means responsive to the signals from the first means for producing signals having amplitudes compressed relative to the amplitudes of the signals from the first means, third means responsive to the signals of compressed amplitudes for integrating such signals, fourth means responsive to the signals of compressed amplitudes and the integrated signals for producing control signals upon the occurrence of peak amplitudes in the signals of compressed amplitudes, and fifth means responsive to the control signals from the fourth means for reproducing the digital information in accordance with the occurrence of the control signals.

6. The combination set forth in claim 5 wherein the second means includes first unidirectional means and the fourth means includes second unidirectional means.

7. The combination set forth in claim 6 wherein the third means includes a capacitor which is charged by the signals of compressed amplitude and wherein the second unidirectional means are biased by the charge in the capacitor to facilitate the production of the control signal upon the occurrence of the peak amplitudes in the logarithmic signals.

8. The combination set forth in claim 5 wherein the second means produces signals having a compressed amplitude logarithmically related to the amplitude of the signals from the first means.

9. In combination in a system for reading from a medium signals representing digital information and having excursions between positive and negative peaks in a pattern dependent upon the digital information and for reproducing the digital information from such signals, first means for reading the signals from the medium, second means responsive to the signals from the first means for rectifying such signals to produce unidirectional signals, third means responsive to the unidirectional signals for producing signals having amplitudes compressed relative to the amplitudes of the unidirectional signals, storage means responsive to the logarithmic signals for storing energy at a magnitude related to the amplitude of the signals of compressed amplitude, amplifier means having an input connected to the storage means and having an output and having first and second states of operation and responsive to the signals of compressed amplitude and the energy stored in the storage means for operating in the first state with the amplitude of the compressed signals greater than the level of the energy in the storage means and for operating in the second state upon the occurrence of a greater level of the energy in the storage means than the amplitude of the signals of compressed amplitude, and fourth means responsive to the operation of the amplifier means in the second state for reproducing the digital information.

10. The combination set forth in claim 9 wherein the storage means is capacitive and the third means includes a unidirectional member.

11. The combination set forth in claim 10 wherein the fourth means includes a monostable member for producing triggering signals upon each operation of the third means in the second state and further includes bistable means responsive to the triggering signals and the signals from the first means for reproducing the digital information.

12. In combination in a system for reading from a medium signals representing digital information and having excursions between positive and negative peaks in a pattern dependent upon the digital information and for reproducing the digital information from such signals, first means for reading the signals from the medium, amplitude compressing means responsive to the signals from the first means for compressing the amplitudes of such signals, second means for integrating the signals from the amplitude compressing means, amplifier means having inputs and an output and responsive at the inputs to the signals from the first means and to the integrated signals from the second means for producing at the output an amplified signal dependent upon the polarity of any difference between the signals from the first and second means, and third means responsive to the operations of the amplifier means in response to a particular polarity in the difference between the signals from the first and second means for reproducing the digital information.

13. The combination set forth in claim 12 wherein the amplitude compressing means produce signals of compressed amplitude logarithmically related to the amplitudes of the signals from the first means.

14. In combination in a system for reading from a medium signals representing digital information and having excursions between positive and negative peaks in a pattern dependent upon the digital information and for reproducing the digital information from such signals, first means for reading the signals from the medium, second means responsive to the signals from the first means for producing signals having amplitudes compressed relative to the amplitudes of the signals from the first means, third means responsive to the signals of compressed amplitudes for integrating such signals, amplifier means having a high gain and a high bandwidth and having an input connected to the integrating means and having first and second states of operation and responsive to the signals of compressed amplitudes and the integrated signals for operating in the first state with the amplitude of the compressed signals greater than the amplitude of the integrated signals and for operating in the second state upon the occurrence of an amplitude of the integrated signals at least as great as the amplitude of the signals of compressed amplitude, and fourth means responsive to the operation of the amplifier means in the second state for reproducing the digital information.

15. The combination set forth in claim 14 wherein the integrating means includes a storage member and wherein means are provided for providing a feedback from the output to the input of the amplifier.

16. The combination set forth in claim 15 wherein the second means produces signals of compressed amplitude logarithmically related to the amplitudes of the signals from the first means.

17. The combination set forth in claim 16 wherein means are responsive to the signals from the first means for rectifying such signals to produce signals of a unidirectional polarity and wherein the second means are responsive to the signals of unidirectional polarity for producing the signals having the compressed amplitude.

* * * * *